(12) United States Patent
Kelderman

(10) Patent No.: US 6,901,728 B2
(45) Date of Patent: Jun. 7, 2005

(54) EXPANDING AND CONTRACTING IMPLEMENTS

(76) Inventor: Gary L. Kelderman, 2674 Hwy., 92, Oskaloosa, IA (US) 52577

( * ) Notice: Subject to any disclaimer, the term of this patent is extended or adjusted under 35 U.S.C. 154(b) by 0 days.

(21) Appl. No.: 10/315,503

(22) Filed: Dec. 10, 2002

(65) Prior Publication Data

US 2004/0107683 A1 Jun. 10, 2004

(51) Int. Cl.[7] .................. A01D 34/03; A01D 34/43; A01D 34/64
(52) U.S. Cl. .................................................. 56/14.7
(58) Field of Search .................. 172/311, 456, 172/126, 132; 56/14.7, 15.8, 13.6, 16.2, 6

(56) References Cited

U.S. PATENT DOCUMENTS

| | | | | |
|---|---|---|---|---|
| 3,554,295 A | * | 1/1971 | Kopaska | 172/398 |
| 3,941,194 A | * | 3/1976 | Orthman | 172/311 |
| 4,245,458 A | * | 1/1981 | Smith | 56/377 |
| 4,304,086 A | * | 12/1981 | Stuchl | 56/6 |
| 4,432,192 A | * | 2/1984 | Maier et al. | 56/15.3 |
| 4,538,400 A | | 9/1985 | Hottes | |
| 4,697,405 A | | 10/1987 | DeWitt et al. | |
| 4,848,069 A | * | 7/1989 | Ermacora et al. | 56/15.8 |
| 4,858,417 A | | 8/1989 | Priefert et al. | |
| 4,922,699 A | | 5/1990 | Gantzer | |
| 4,960,242 A | * | 10/1990 | Larson | 239/168 |
| 4,974,399 A | | 12/1990 | Haberkorn | |
| 5,113,956 A | * | 5/1992 | Friesen et al. | 172/311 |
| 5,313,772 A | | 5/1994 | Tonutti | |
| 5,321,938 A | | 6/1994 | LeBlanc | |
| 5,715,667 A | | 2/1998 | Goman et al. | |
| 6,421,994 B1 | | 7/2002 | Boucher et al. | |

FOREIGN PATENT DOCUMENTS

JP 2000312520 11/2000

* cited by examiner

Primary Examiner—Árpád Fábián Kovács
(74) Attorney, Agent, or Firm—Sturm & Fix LLP

(57) ABSTRACT

For transportability, wide machinery such as disk and cycle-bar mowers are often detached from the tractor on which they are used, and loaded onto a truck or trailer. A new method is to make these wide machines retractable such that their width is no wider than allowed for transport on public roads, yet extendable to increase the efficiency of the time and horsepower used to accomplish the intended task, such as mowing. To permit the extension and retraction of a machine such as a mower, a tool-bar is mounted parallel to the tractor's axles. It is stationary with respect to the tractor. A sliding tool-bar is mounted next to and parallel with the stationary tool-bar. A hydraulic cylinder, affixed to the stationary tool bar and the sliding tool-bar, causes the sliding tool-bar to slide in a direction parallel with the stationary tool-bar. The machine is affixed to the sliding tool-bar, so it can be extended and retracted with the sliding toolbar. Multiple sliding tool-bars are also possible, permitting the machine to extend to either side of the tractor.

29 Claims, 5 Drawing Sheets

EXPANDING AND CONTRACTING IMPLEMENTS

BACKGROUND OF THE INVENTION

1. Field of the Invention

The present invention relates generally to farm and field equipment. More particularly the present invention relates to a method and apparatus for transportable tractor-driven equipment. Such equipment includes disk and cycle-bar mowers, planters, and sprayer booms that, in use, are necessarily of greater width than the tractor or vehicle carrying them.

2. Background Art

In order to make efficient use of time and horsepower when in use, tractor-driven disk and cycle-bar mowers are significantly wider than the tractor (or other vehicle) on which they are mounted. Modem mowers extend to both sides of the tractor—often being mounted on the front of the tractor so the material being mowed is not run over by the wheels of the tractor before being cut. Transporting such a unit on public roads is not safe, and is illegal in most areas. In present-day practice, this necessitates detaching the mower from the tractor and loading it on a truck or trailer for transport on public roads, thereby reducing some of the efficiency gained by having a wide machine.

There is, therefore, a need for a method and apparatus for making wide, tractor-driven machinery such as mowers, sprayer booms, and planters transportable while still mounted to the tractor.

SUMMARY OF THE INVENTION

A purpose of this invention is to provide a method and apparatus for making wide, tractor- or other vehicle-driven machinery such as mowers, sprayer booms, and planters transportable while still mounted to the tractor.

To accomplish this objective, a first tool-bar is constructed and mounted such that it is stationary relative to the tractor's hitch on which the machinery is mounted. This first tool-bar is substantially parallel to the axles of the vehicle when mounted. Two additional tool-bars are mounted on each side of and parallel to the first, stationary tool-bar. Two actuators, such as hydraulic cylinders, are affixed to the first tool-bar and also attach to the additional two tool-bars such that actuating the actuators results in the movement of the two additional tool-bars in the direction parallel to the first tool-bar. In this way, the two additional tool-bars can be retracted such that the overall width of the tool-bar assembly is narrow, or they can be extended to widen the entire assembly.

The machinery, such as a disk-mower, is attached in two sections, one section to each of the additional tool-bars. The disk-mower bars are mounted parallel to the tool-bars. Now, when the additional two tool-bars are extended and retracted by the actuators, the mowers are also extended and retracted. In the retracted position, the mowers overlap one another, and the overall width of the unit is not greater than permissible for road transport. When in the extended position, the inside ends of the mower are positioned such that no portion of the swath is left uncut. The overall width of the mower is significantly greater than the width of the tractor's wheels.

Configured as described, a machine, such as a mower, is useable to its intended purpose, yet transportable without detaching from the tractor.

The novel features which are believed to be characteristic of this invention, both as to its organization and method operation together with further objectives and advantages thereto, will be better understood from the following description considered in connection with accompanying drawings in which a presently preferred embodiment of the invention is illustrated by way of example. It is to be expressly understood however, that the drawings are for the purpose of illustration and description only and not intended as a definition of the limits of the invention.

BEST MODE FOR CARRYING OUT THE INVENTION

Figure 1:
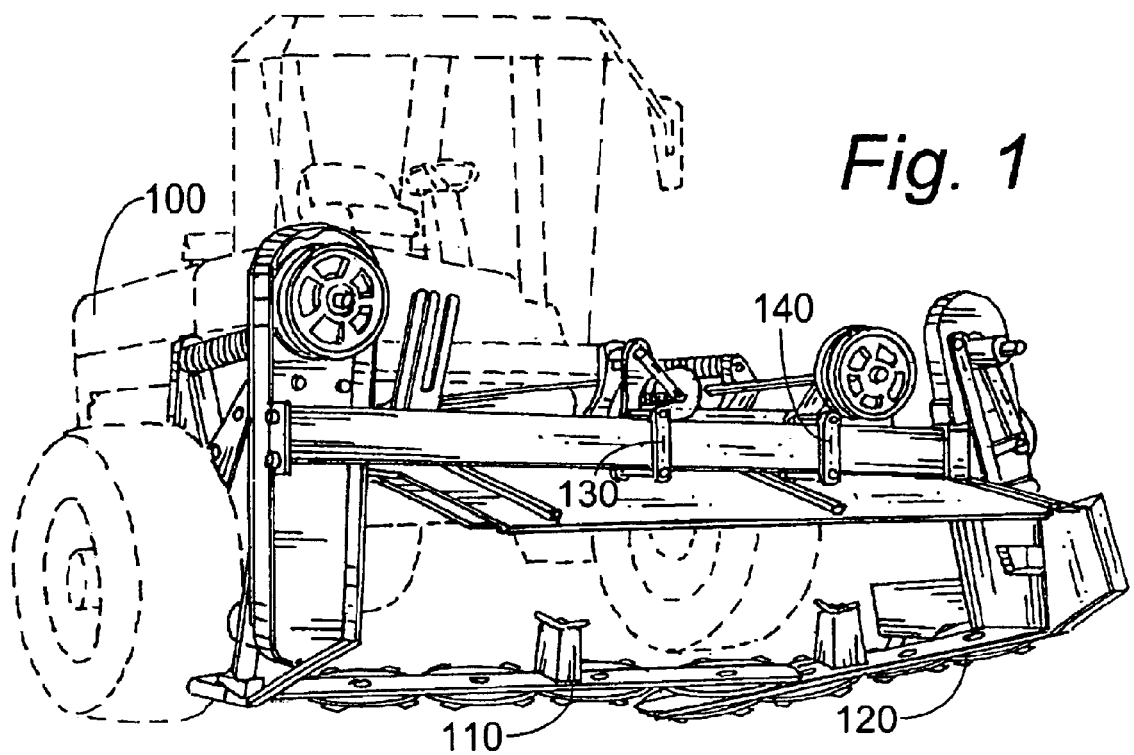
FIG. 1 shows a perspective view of a mower mounted to the front of a tractor.

The location of a tractor-driven implement, relative to the tractor, depends on the purpose for which the implement is carried. FIG. 1 shows a disk mower mounted on the rear of a special farm tractor 100 although the mower could be mounted on the front of the tractor 100, if desired. The term "tractor" as used in this patent is intended to mean any prime mover. It is shown in the transport position, with mower sections 110 and 120 in their inner-most position, so they are overlapping.

Figure 2:
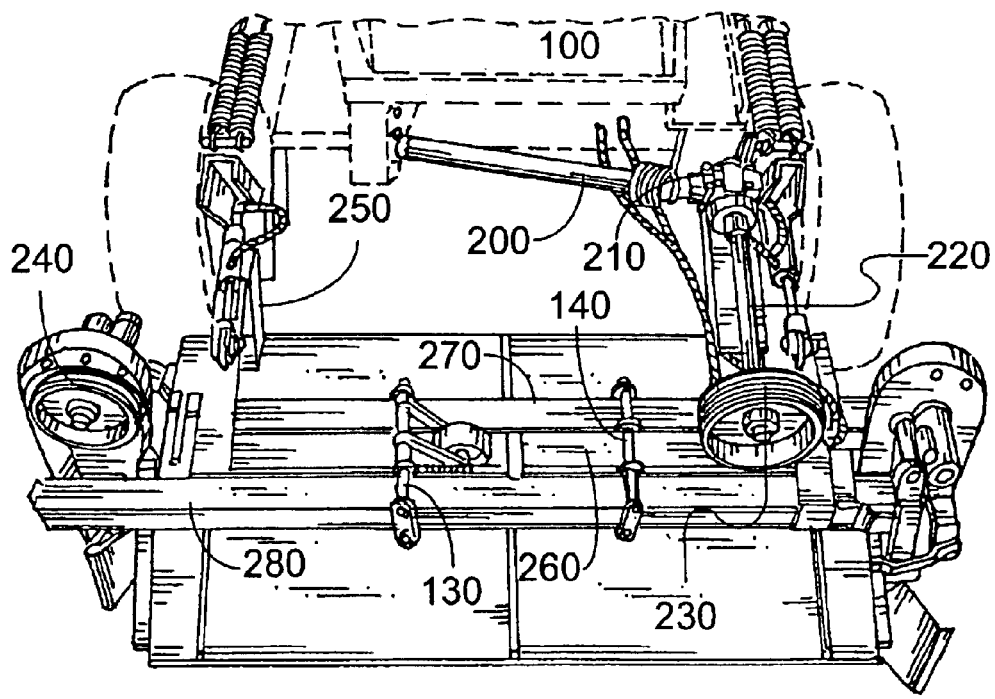
FIG. 2 shows a view from above of a mower mounted to the front of a tractor.

The same mower in the same position is shown in a different view in FIG. 2. Here, we can see the Power Take Off (PTO) shaft 200, transferring power from the tractor to the mower's gear box 210. The gear box causes the axis of rotation to shift 90°, so the power is applied to the first pulley shaft 220, which drives the first pulley 230, a multiple V-belt pulley. The first pulley 230 drives multiple V-belts (not shown in FIG. 2), at least one of which drives a second pulley 240. This second multiple V-belt pulley 240 drives at least one V-belt which ultimately drives one mower section 110. A third pulley (not visible in FIG. 2), similarly, drives the other mower section 120. The mower is mounted to the tractor with a hitch such as the two-point quick-hitch 250 shown. With a hitch of this type, the mower can be raised into a transport position, or lowered to an operating position.

A first tool-bar 260 is situated substantially parallel the tractor's 100 axles, and is indirectly attached to the hitch 250, making the first tool-bar substantially stationary relative to the hitch arms 250. Two extending tool-bars 270, 280 lie adjacent and parallel to the first tool-bar 260. These extending tool-bars 270, 280 are actuated by hydraulic cylinders residing inside the first tool-bar 260 (so they cannot be seen in FIG. 2). When the hydraulic cylinders are extended out, the extending tool-bars 270, 280 slide or roll away from center, in lines parallel to the first tool bar 260. For stability, two bracket assemblies 130, 140 tie the first tool-bar 260 to the extending tool-bars 270, 280 sufficiently loosely to allow for their sliding.

Figure 3:
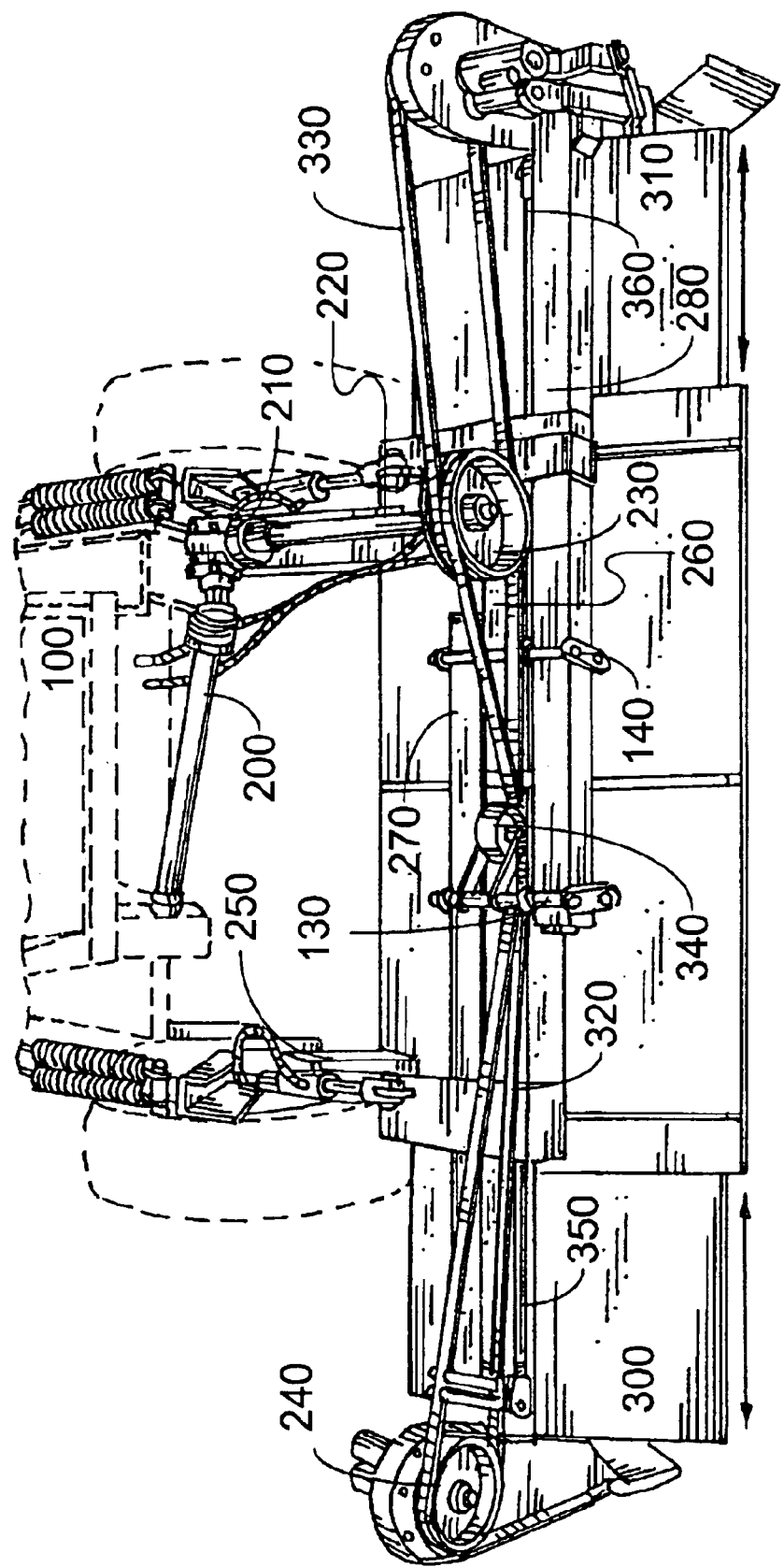
FIG. 3 shows a mower in the extended position.

The mower has been extended for operation in FIG. 3. The mower sections have been moved from their overlapping position as evidenced by the "wings" 300, 310 which have been extended from the center as indicated by the double arrows. The V-belts 320, 330, driven by pulley 230, are clearly seen in this view. V-belt 320 is tensioned and stabilized by idler pulley 340.

The extending tool-bars 270, 280 are shown in their extended position. The extension is carried out by hydraulic cylinders inside the first tool-bar 260. Only the shafts 350, 360 of the hydraulic cylinders can be seen in FIG. 3.

In FIG. 4, the mower is, once again, shown retracted for transport. It is only as wide as the tractor 100 as indicated by width 400. The third multiple V-belt pulley 410, not visible in FIGS. 1–3 is now readily seen.

Figure 4:
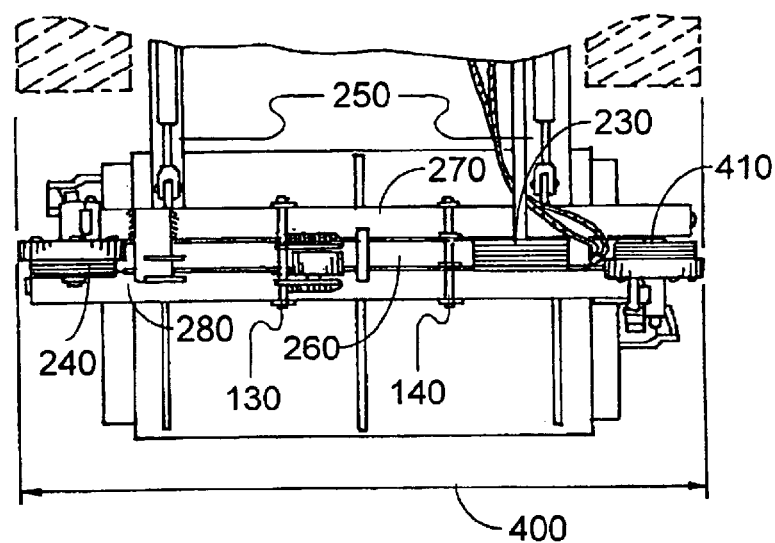
FIG. 4 shows a plan view of a mower in transport position.
Figure 5:
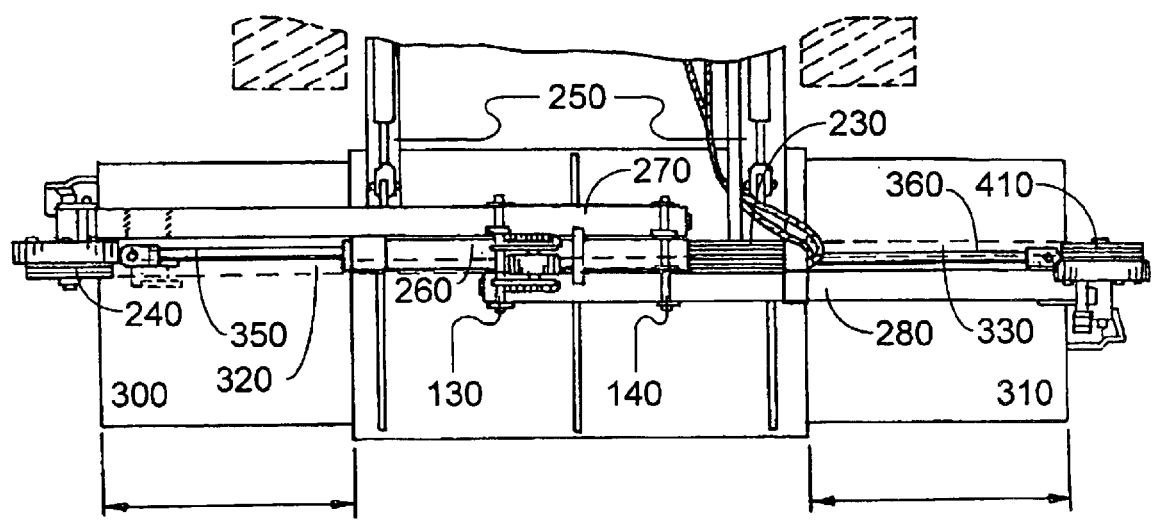
FIG. 5 shows a plan view of a mower in the extended position.

From the same vantage point as FIG. 4, the mower is shown in its extended configuration in FIG. 5. The shafts 350, 360 of the hydraulic cylinders can be seen extending out of the first tool bar 260. The V-belts 320, 330 are shown as dashed-lines in FIG. 5.

Figure 6:
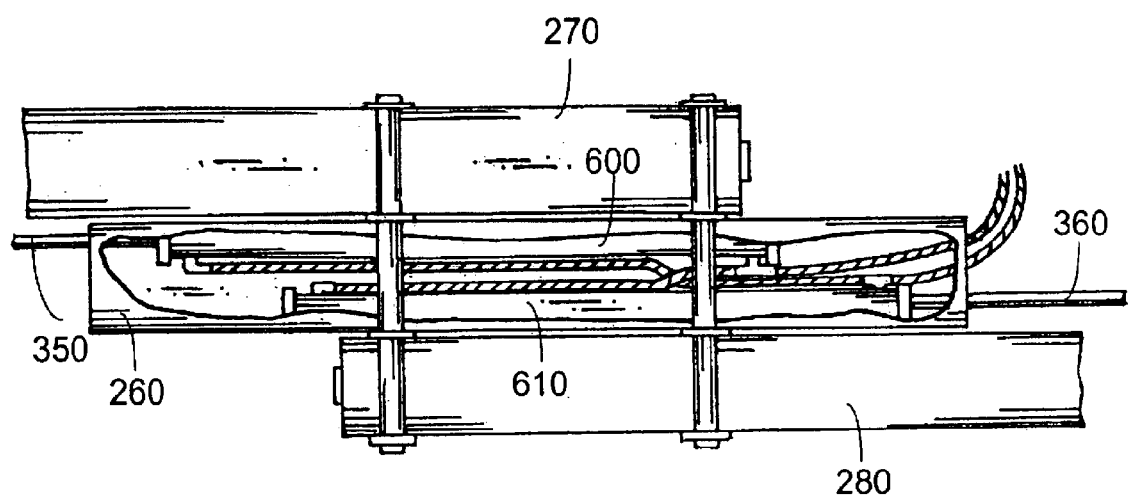
FIG. 6 shows hydraulic cylinders inside a middle toolbar.

Two hydraulic cylinders 600, 610, situated inside the first toolbar 260 are shown in FIG. 6. The cylinders may be arranged end-to-end, as shown, or my lie side-by-side to increase the overall extension capability.

Figure 7:
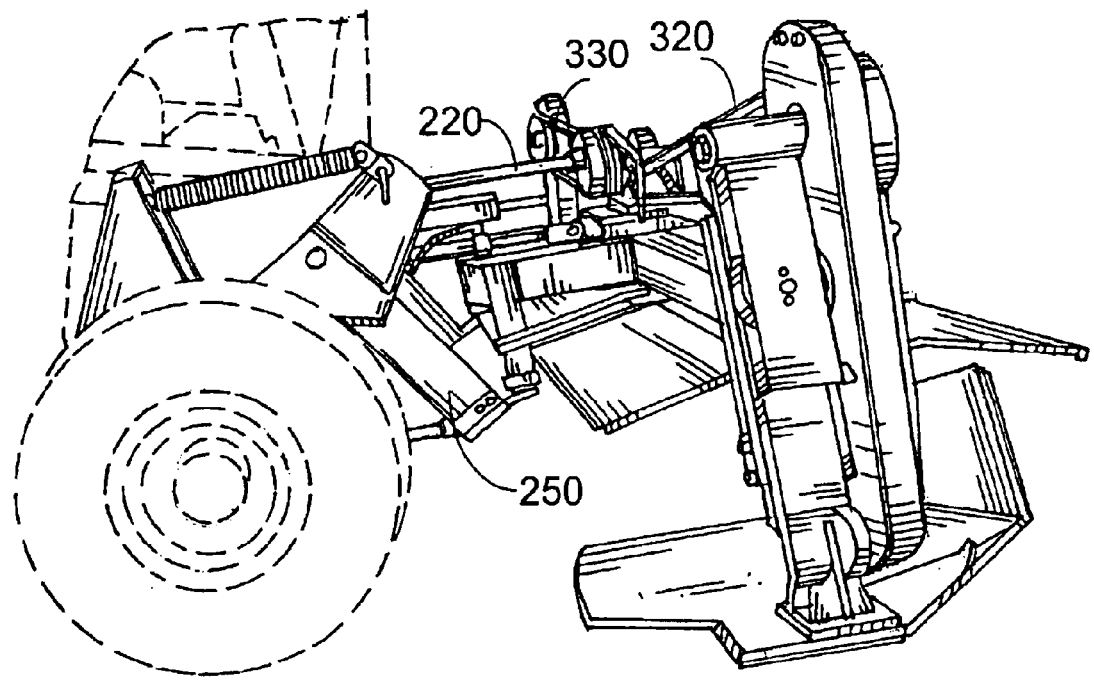
FIG. 7 shows a view of a mower from the side.

A side view of the mower is shown in FIG. 7. The V-belts 320, 330 are clearly shown, as is first pulley shaft 220. Just right of the wheel is the hitch 250.

Figure 8:
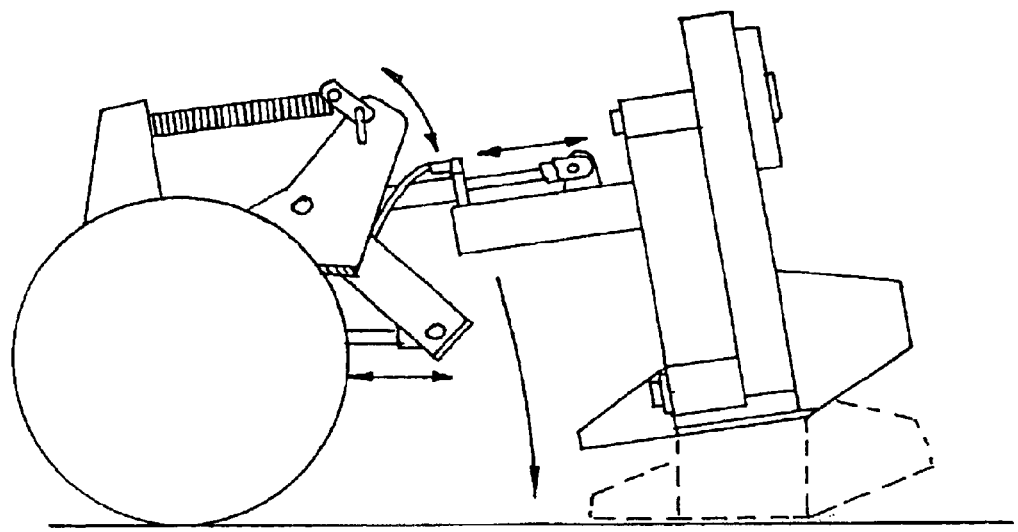
FIG. 8 shows a view of the mower from the side showing the transport and operating positions of the mower.

In FIG. 8, the transport (upper) and operating (lower) positions of the mower are shown.

The above embodiment is the preferred embodiment, but this invention is not limited thereto. For example, while the preferred embodiment shows the longitudinal axis of each tool bar 260, 270 and 280 as substantially parallel to the axis of the rear axle of the tractor 100, it is well known that the tool bars can be still substantially horizontal but non-parallel to the axis of the rear axle but such sections can still be retracted in such arrangement. The illustrations all show a mower, but this invention can be used for many types of farm implements including mowers, planters and sprayer booms. Consequently, many modifications and variations of the present invention are possible in light of the above teachings. It is, therefore, to be understood that within the scope of the appended claims, the invention may be practiced otherwise than as specifically described.

I claim:

1. A method for providing for a transport of a wide, tractor-mounted mower having moveable sections operatively attached to a tractor, said method comprising:
   using a substantially mechanical actuator to refract the sections in an inward direction such that each point on the moveable sections follows a trajectory substantially parallel to an axis of rotation of rear wheels of the tractor on which the moveable sections are mounted when said tractor is moving linearly in a forward direction such that a width of the overall tractor-mounted mower is reduced.

2. The method of claim 1 wherein there are two sections, the method comprising:
   (a) mounting each of two sections on two toolbars, arranged parallel to one another and parallel to the axles of the tractor on which the mower is mounted; and
   (b) forcing the two toolbars to travel in opposite directions substantially parallel to themselves to reduce the overall width of the tractor-mounted mower.

3. The method of claim 1 further comprising using the substantially mechanical actuator to move the sections in an outward direction substantially parallel to axles of the tractor on which they are mounted such that a width of the overall tractor-mounted mower is increased.

4. The method of claim 2 wherein the toolbars slide when traveling in opposite directions substantially parallel to themselves.

5. The method of claim 1 wherein the mower is a disk-mower.

6. The method of claim 1 wherein the mower is a sickle-bar mower.

7. The method of claim 1 wherein the actuator is a hydraulic cylinder.

8. The method of claim 1 wherein the tractor-driven mower can also be extended such that it extends beyond at least one edge of the tractor.

9. The method of claim 1 wherein the tractor-driven mower is comprised of two sections, each section capable of retracting.

10. The method of claim 9 wherein the tractor-driven mower is also capable of being extended such that it extends beyond outside edges of the tractor.

11. The method of claim 10 wherein inside ends of the tractor-driven mower are placed such that there is no gap between them when viewed from directly behind when the tractor-driven mower is extended to a full extent.

12. The method of claim 2 wherein the at least one actuator comprises at least one hydraulic cylinder.

13. The method of claim 3 wherein the at least one actuator comprises at least one hydraulic cylinder.

14. An apparatus for providing for a transport of a wide, tractor-mounted mower, while mounted on a tractor, the apparatus comprising:
   at least two sections operatively attached to the mower and moveable in a direction substantially parallel to axles of the tractor on which they are mounted between a first outer operative position and a second inner transport position such that a width of the overall tractor-mounted mower is reduced in the transport position thereof; and
   having at least one substantially mechanical actuator operatively attached to the mower and to the sections for facilitating movement of the sections between the operative and the transport position thereof; and
   each of the two sections being mounted on two toolbars, the toolbars being arranged parallel to one another and parallel to the axles of the tractor on which the mower is mounted; and
   means for forcing the two toolbars to travel in opposite directions substantially parallel to themselves to reduce the overall width of the tractor-mounted mower.

15. The apparatus of claim 14 wherein the toolbars are slideably mounted to the mower so that the toolbars slide when traveling in opposite directions substantially parallel to themselves.

16. The apparatus of claim 14 wherein the mower is a disk-mower.

17. The apparatus of claim 14 wherein the mower is a sickle-bar mower.

18. The apparatus of claim 14 wherein the at least one actuator is a hydraulic cylinder.

19. The apparatus of claim 14 wherein the two sections extend beyond at least one edge of the tractor in the operative position thereof.

20. The apparatus of claim 14 the two sections extend beyond outside edges of the tractor in the operative position thereof.

21. The apparatus of claim 20 wherein inside ends of the tractor driven mower are disposed such that there is no gap between them when viewed from directly behind when the tractor-drive mower is extended to a full extend.

22. The apparatus of claim 14 wherein said apparatus is operatively attached to a tractor having at least two wheels rotatably attached about a substantially horizontal axis and wherein the sections are retracted along axes which are substantially parallel to said substantially horizontal axis.

23. The apparatus of claim 14 wherein the at least one actuator comprises at least one hydraulic cylinder.

24. A method for providing for a transport of wide, tractor-mounted mower, while mounted on a tractor, the mower having sections each of which having a longitudinal axis, said method comprising:

using a substantially mechanical actuator to retract the sections along at least one axis substantially transverse to an axis defining the forward direction of the tractor such that a width of the overall tractor-mounted mower is reduced for transportation purposes;

using the actuator to extend the sections along said at least one axis substantially transverse to an axis defining the forward direction of the tractor such that a width of the overall tractor-mounted mower is increased for operational purposes.

25. An apparatus for extending a tool bar for operation and retracting the tool bar for transport, said apparatus comprising:

a first tool bar being adapted to be attached to a prime mover and being disposed generally along a first longitudinal axis, said first longitudinal axis of the first tool bar being generally transverse to a direction of forward movement of the prime mover; and a second tool bar operatively attached to said first tool bar, said second tool bar being disposed about a second longitudinal axis which is generally parallel to the first longitudinal axis; and mechanical actuator means for moving said second tool bar along said second longitudinal axis between a first retracted transport position and a second extended operational position to one side of said first tool bar;

a third tool bar operatively attached to said first tool bar, said third tool bar being disposed about a third longitudinal axis which is generally parallel to the first longitudinal axis; and means for moving said third tool bar along said third longitudinal axis between a retracted transport position and an extended operational position to the other side of said tool bar.

26. The apparatus of claim 25 wherein the means for moving the second tool bar and the means for moving the third tool bar include means for moving the second and third tool bars simultaneously.

27. The apparatus of claim 25 wherein said means for moving the second and third tool bars includes at least one hydraulic cylinder.

28. An apparatus for extending a tool bar for operation and retracting the tool bar for transport, said apparatus comprising:

a first tool bar being adapted to be attached to a prime mover and being disposed generally along a first longitudinal axis, said first longitudinal axis of the first tool bar being generally transverse to a direction of forward movement of the prime mover; and a second tool bar operatively attached to said first tool bar, said second tool bar being disposed about a second longitudinal axis which is generally parallel to the first longitudinal axis; and a first hydraulic cylinder operatively attached to said first and second tool bars for moving said second tool bar along said second longitudinal axis between a first retracted transport position and a second extended operational position to one side of said first tool bar; and a third tool bar operatively attached to said first tool bar, said third tool bar being disposed about a third longitudinal axis which is generally parallel to the first longitudinal axis; and a second hydraulic cylinder for moving said third tool bar along said third longitudinal axis between a refracted transport position and an extended operational position to the other side of said tool bar.

29. The apparatus of claim 28 wherein the first and second hydraulic cylinders for moving the first and second tool bars include means for moving the second and third tool bars simultaneously.

* * * * *